United States Patent [19]

Soethout et al.

[11] Patent Number: 4,765,230
[45] Date of Patent: Aug. 23, 1988

[54] ASSEMBLY FOR VENTILATION SYSTEM OF MOTOR VEHICLE

[75] Inventors: Freddie Soethout, Cologne; Wolfgang Radtke, Steinenbrück, both of Fed. Rep. of Germany

[73] Assignee: Siemens Aktiengesellschaft, Munich, Fed. Rep. of Germany

[21] Appl. No.: 78,546

[22] Filed: Jul. 28, 1987

[30] Foreign Application Priority Data

Aug. 4, 1986 [DE] Fed. Rep. of Germany ....... 3626392
Aug. 4, 1986 [DE] Fed. Rep. of Germany ....... 3626393
Aug. 4, 1986 [DE] Fed. Rep. of Germany ....... 3626395

[51] Int. Cl.4 .............................................. B60H 3/06
[52] U.S. Cl. ....................................... 98/2.11; 98/2.05
[58] Field of Search ................... 98/2, 2.05, 2.06, 2.07, 98/2.11

[56] References Cited

U.S. PATENT DOCUMENTS 3,661,069 5/1972 Grosseau ................................ 98/2.05
4,390,124 6/1983 Nilsson ............................. 98/2.05 X

FOREIGN PATENT DOCUMENTS 59315 2/1975 Australia ............................... 98/2.05
3330950 3/1985 Fed. Rep. of Germany ....... 98/2.11
2556289 6/1985 France .................................. 98/2.05
68414 5/1980 Japan ................................... 98/2.11

Primary Examiner—Harold Joyce
Attorney, Agent, or Firm—Kenyon & Kenyon

[57] ABSTRACT

A ventilating system for a motor vehicle comprises an air mixing and filtering assembly including a housing defining an air mixing chamber, the housing including a first air inlet port for conducting into the air mixing chamber air from the external environment, a second air inlet port for conducting from the passenger compartment of the motor vehicle air to be recirculated and an outlet port for conducting a composite air stream to the passenger compartment. The assembly includes a filter disk which is pivotably mounted to the housing, the filter disk simultaneously serving as a means for setting the proportions of external air and recirculated air. The filter connection piece forms a part of the housing defining the air mixing chamber.

13 Claims, 4 Drawing Sheets

ASSEMBLY FOR VENTILATION SYSTEM OF MOTOR VEHICLE

BACKGROUND OF THE INVENTION

This invention relates to an assembly for a ventilating system of a motor vehicle. More particularly, this invention relates to such an assembly provided with at least one filter and at least one movable air guide element for controlling the flow of air.

Ventilating systems of motor vehicles generally include a housing which defines an air mixing chamber. The walls of the housing are provided with a first air inlet port for conducting air from outside the vehicle into the air mixing chamber. A second air inlet port is provided in the housing for introducing air from the ventilated space, i.e., the passenger compartment of the motor vehicle, into the air mixing chamber. The air mixing chamber in turn communicates with the passenger compartment of the motor vehicle via an air outlet port.

In one known ventilating system, a filter is positioned upstream of the first air inlet port for purifying the air drawn in from the external environment. In addition, between the second air inlet port and the outlet port a swiveling flap is provided for setting the ratio or proportion of outside air to recirculated air. In that prior ventilating system, as disclosed in German Patent Document No. 33 30 951, no provision is made for filtering the recirculated air.

An object of the present invention is to provide an improved ventilating system for motor vehicles.

Another object of the present invention is to provide a motor vehicle ventilating system with an air mixing chamber assembly which is simple and inexpensive to manufacture and install.

Another, more particular, object of the present invention is to provide such a motor vehicle ventilating system wherein a single filter suffices for filtering both air drawn in from the environment recirculated air.

Another particular object of the present invention is to provide such a motor vehicle ventilating system wherein unfiltered air in varying amounts may be conducted to the passenger compartment of the motor vehicle through the air mixing chamber of the ventilating system.

SUMMARY OF THE INVENTION

An assembly for use in the ventilation system of a motor vehicle comprises, in accordance with the present invention, a housing defining an air chamber and including walls provided with a first air inlet port communicating with the atmosphere outside the motor vehicle for introducing air from outside of the motor vehicle into the chamber. The walls of the housing are further provided with a second air inlet port communicating with a passenger compartment of the motor vehicle for introducing air from the passenger compartment into the air chamber. An air outlet port in the housing communicates with the passenger compartment for conducting air from the air chamber to the passenger compartment. Pursuant to the present invention, an air mixing control component is provided in the housing for controlling the proportions of air from outside the motor vehicle and air from the passenger compartment guided through the air chamber into the passenger compartment, the air mixing control component including a substantially planar filter pivotably mounted in the air chamber for rotation about a rotational axis.

The filter preferably takes the form of a flat filter disk which functions simultaneously as a filter and as an air guide flat for setting the ration or proportion of outside air to recirculated air. Accordingly, incoming air can apportioned solely by positioning and repositioning the filter. There is no necessity for an additional air deflection flap. Simultaneously, the swiveling filter can be used apportion amounts of filtered and non-filtered air, both from outside the motor vehicle and from the passenger compartment. Care must be taken, however, at least in the closed position of the filter, and advantageously throughout the operative range of filter positions, that the dimensions of the filter and the inside wall of the air chamber are so matched to one another that the filter fits into the housing with little play.

Pursuant to a particular embodiment of the present invention, the housing includes a filter connection piece, the filter taking the form of a disk diposed at one end of the filter connection piece. Advantageously, the air mix control component includes a flap pivotably mounted to the housing and having a first end position closing the first air inlet port and a second end position closing the one end of the filter connection piece. Preferably, the flap is rotatable about the rotational axis of the filter.

In another embodiment of the present invention, which is particularly simple in construction, the filter itself is provided with slide elements or surfaces which serve to adjust the relative amounts of outside air and recirculated air being fed to the air mixing chamber of the ventilating system. Specifically, the housing includes a wall in the form of a cylindrical section coaxial with the rotational axis of the filter, that axis being located along an end face of the filter. The first air inlet port and the second air inlet port are disposed in the cylindrical section and are angularly spaced from one another. The filter is provided opposite the rotational axis with an end surface or slide element alternatively juxtaposable to the first air inlet port and to the second air inlet port to alternatively block the first air inlet port and the second air inlet port in accordance with the rotational position of the filter.

In yet another specific embodiment of the present invention, wherein the housing includes a first wall in the form of a cylindrical section coaxial with the rotational axis of the filter and wherein that axis is located along an end face of the filter, the housing includes a second wall extending substantially perpendicularly to the rotational axis of the filter and to the cylindrical wall section. One of the air inlet ports is disposed in the cylindrical section, while the other air inlet port is disposed in the second, transversely extending, wall. The filter is provided opposite the rotational axis with an end surface or first slide element juxtaposable to the one air inlet port in accordance with the rotational position of the filter. The filter is further provided in a plane parallel to the second wall with a second slide element juxtaposable to the other air inlet port in accordance with the rotational position of the filter. Advantageously, in this embodiment, the first slide element takes the form of a cylindrical section and the first air inlet port and the second air inlet port are disposed in approximately the same radial plane. The first slide element may be provided with a first portion extending in a circumferential direction from one side of the filter and a second portion extending in a circumferential direction from an opposite side of the filter, while the second slide element extends in a circumferential direction from the one side of the filter, i.e., on the same side of the filter as the first portion of the first slide element. The second slide element may be provided with an opening of substantially the same dimensions as the air inlet port in the additional wall of the housing, the opening being located within a circular sector together with the first portion of the first slide element. The second portion of the first slide element is advantageously provided with an aperture of substantially the same dimensions as the air inlet port disposed in the circular wall section of the housing.

In accordance with yet another embodiment of the present invention, the housing includes a first wall in the form of a first cylindrical section and a second wall in the form of a second cylindrical section, the second cylindrical section being substantially opposite the first cylindrical section. The first and the second cylindrical sections are coaxial with the rotational axis of the filter, that axis being located at approximately a center point of the filter. The two cylindrical housing wall sections have a common radius. The first air inlet port is provided in the first cylindrical section and the second air inlet port is provided in the second cylindrical section. The filter is provided on one side with a first end face or slide element juxtaposable to the first air inlet port and on an opposite side with a second end face or slide element juxtaposable to the second air inlet port to alternatively block the first air inlet port and the second air inlet port in accordance with the rotational position of the filter.

DETAILED DESCRIPTION

Figure 1:
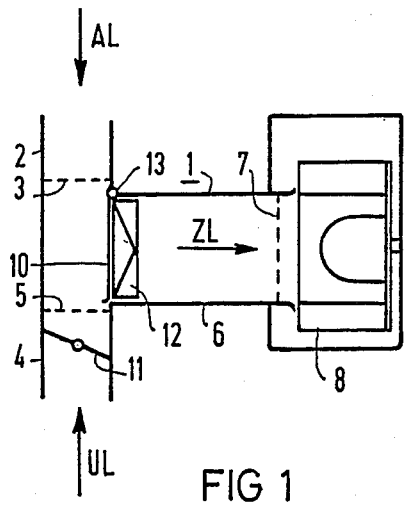
FIG. 1 is a schematic longitudinal cross-sectional view of an air mixing chamber assembly in accordance with the present invention, showing a pivotably mounted filter disk and a pivotably mounted air guide flap.

As illustrated in FIG. 1, an assembly for mixing and filtering air in a motor vehicle's ventilating system comprises, in accordance with the present invention, a housing 1 in turn including a first air intake connection piece 2, a second air intake connection piece 4 and a filter connection piece 6. Intake connection piece 2 has an air inlet port 3 for guiding or conducting air AL from the external environment into filter connection piece 6 which serves in part as an air mixing chamber. Intake connection piece 4 has an air inlet port 5 for guiding or conducting air UL from a passenger compartment (not illustrated) of the motor vehicle into filter connection piece 6. An air stream ZL from the air mixing chamber in filter connection piece 6 is pulled by a fan or blower 8 through a main connection 7 and blown into the passenger compartment of the motor vehicle. In intake connection piece 4 an air flap or valve element 11 is pivotably disposed. At a transition from intake connection pieces 2 and 4 to filter connection piece 6 a flat filter disk 12 is pivotably mounted to housing 1 at an end of filter connection piece 6. The filter disk is pivotable about a rotational axis 13. The form and dimensions of filter disk 12 and of filter connection piece 6 are so matched to each other that the transverse end faces (at the left and right in FIG. 1) of the filter disk fit with little play into the end of filter connection piece 6, whereby the filter occupies essentially the entire cross-section of the filter connection piece.

Figure 2:
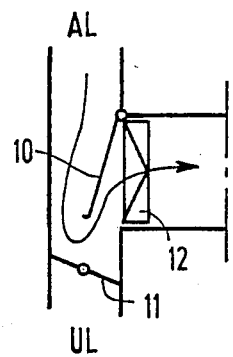
FIGS. 2-6 are partial schematic cross-sectional views of the air mixing chamber assembly of FIG. 1, showing different operational configurations of the filter disk and air guide flap of FIG. 1.
Figure 3:
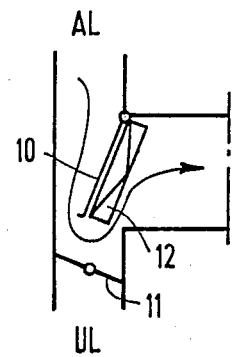
Figure 4:
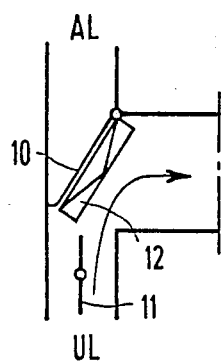
Figure 5:
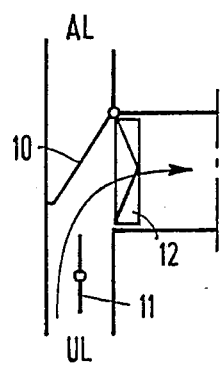
Figure 6:
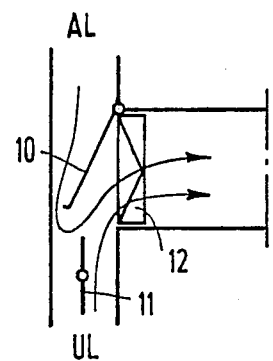

Also mounted to housing 1 for rotation about axis 13 is an air guide flap or deflector 10 which can be pivoted into a position in which it completely blocks intake connection piece 2 and prevents a stream of outside air AL from entering filter connection piece 6, as shown in FIGS. 4 and 5. In addition, air guide flap 10 can be positioned in one or more intermediate orientations for channeling respective predetermined amounts of outside air AL to filter connection piece 6, as depicted in FIGS. 2, 3 and 6. Air flap 11 can assume any rotational position, in particular fully closed FIGS. 1, 2 and 3) or fully opened (FIGS. 4-6).

Filter disk 12, which may take the form of a dust filter, can be swiveled out of filter connection piece 6, as shown in FIGS. 3 and 4. The rotational position of the filter disk can be varied for adjusting the portion of air supply ZL which passes through filter disk 12. Accordingly, should it become necessary or desirable, unfiltered air can be conducted into the passenger compartment of the motor vehicle. By varying both the rotational position of air guide flap 10 and the orientation of filter disk 12, it is possible to change not only the proportions of outside air AL and recirculated air UL in the air stream ZL delivered to the motor vehicle passenger compartment but also the proportions of filtered and unfiltered air.

FIG. 2 shows rotational positions of air guide flaps 10 and 11 and filter disk 12 which conduct a stream of only filtered external air into filter connection piece 6. FIG. 3 shows relative orientations or the air guide flaps and the filter disk which guide a stream of only unfiltered external air into the filter connection piece. In FIG. 4, only unfiltered recirculated air is supplied to the passenger compartment of the motor vehicle, while in FIG. 5 the air supply consists of filtered recirculated air. In FIG. 6, both external and recirculated air are filtered and blown into the passenger compartment.

Figure 7:
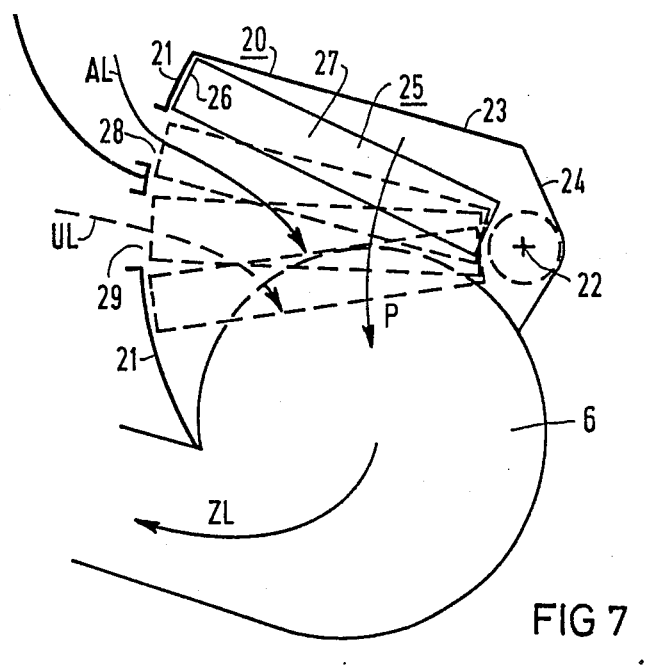
FIG. 7 is a schematic cross-sectional view of another embodiment of an air mixing chamber assembly in accordance with the present invention.

As shown in FIG. 7, a housing 20 defines an air mixing or guide chamber upstream of a fan or blower 60. In longitudinal section, the air chamber essentially has the form of an annular sector. The air mixing chamber is bounded perpendicularly to the plane of the drawing by a first wall 21 in the form of a cylindrical section and by planar walls 23 and 24. Parallel to the plane of the drawing the air mixing chamber is defined by two transversely extending planar walls (not designated) spaced from one another. A swivelable filter disk 25 is pivotably disposed in housing 20 for rotation about an axis 22. The filter disk has a slide element or surface 26 at an end spaced from rotational axis 22 and another slide element or surface 27 extending in a plane parallel to the plane of the drawing. Rotational axis 22 coincides with the cylinder axis of cylindrical section 21. Filter disk 25 is designed as a dust filter and has a shape and dimensions so matched to the shape and dimensions of the air mixing chamber that the filter moves therein with little play.

Cylindrical section 21 has a first inlet port 28 for the introduction of air from the external environment and a second inlet port 29 for the introduction of recirculated air from the passenger compartment of the motor vehicle. The inlet ports extend parallel to axis 22 and are circumferentially spaced from one another. The inlet ports 28 and 29 are so dimensioned that they are alternatively closable by slide surface or end face 26 of filter disk 25 in accordance with the rotational position thereof, as indicated by dashed lines in FIG. 7.

Upon a pivoting of filter disk 25 into the position shown in solid lines in FIG. 7, both external air AL and recirculated air UL are drawn unhindered and unfiltered into the air mixing chamber and blown as a single air stream ZL into the passenger compartment by blower 60. By swiveling filter disk 25 in the direction of arrow P, the fraction of external air AL is initially steadily reduced and then totally blocked. With further pivoting of the filter disk, an increasing proportion of filtered external air and a decreasing proportion of unfiltered recirculated air is fed through the air mixing chamber into the passenger compartment. In an intermediate position of filter disk 25, slide element or end face 26 of filter disk 25 completely blocks opening 29, whereby air stream ZL consists only of filtered external air. In an end position of filter disk 25 (lowermost position in FIG. 7), both external air AL and recirculated air UL are conducted through filter disk 25 to form air stream ZL.

Figure 8:
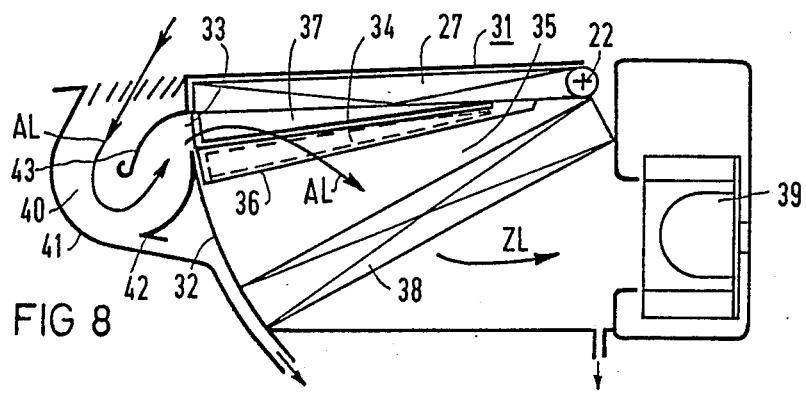
FIG. 8 is a schematic cross-sectional view of another embodiment of an air mixing chamber assembly in accordance with the present invention, showing a pivotably mounted filter disk.

In the embodiment illustrated in FIG. 8, air mixing chamber housing 31 includes a first wall 32 in the form of a cylindrical section having an axis coinciding with a rotational axis 22' of a pivotably mounted filter disk 25'. In contrast to the embodiment of FIG. 7, cylindrical section 32 of the embodiment of FIG. 8 has only one inlet port 33, which communicates with the external environment for enabling the introduction of an external air stream AL into the air mixing chamber defined by housing 31. Another inlet port 34 is provided in a transversly extending front wall 35 of housing 1 for enabling the conveyance of recirculated air from the passenger compartment into the air mixing chamber. Inlet port 34 has a triangular or wedge shape and may be partially or totally blocked by a slide element 36 extending from filter disk 25' in a plane parallel to the plane of the drawing. Inlet port 34 may also be partially or totally blocked by a side surface 27' of filter disk, depending on the rotational position of the filter disk. In the rotational position of filter disk 25' illustrated in FIG. 8, inlet port 34 is covered completely by slide element 36 while inlet port 33 is completely open. Accordingly, the air stream ZL blown into the motor vehicle passenger compartment by a fan 39 consists entirely or unfiltered air AL from the external environment.

Figure 9:
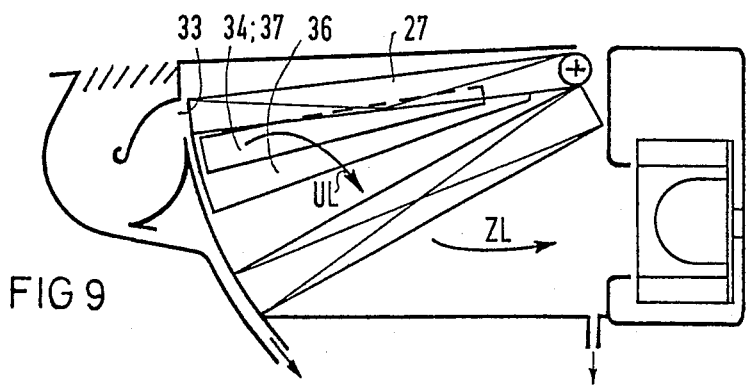
FIGS. 9-11 are schematic cross-sectional views of the air mixing chamber assembly of FIG. 8, showing different operational positions of the filter disk.

As depicted in FIGS. 8 and 9, slide element 36 is provided with a wedge-shaped aperture 37 which in the rotational position of filter disk 25' shown in FIG. 9 is superimposed on wedge-shaped inlet port 34 so that, inasmuch as inlet port 33 is blocked by an end face of filter disk 25', only unfiltered recirculated air UL is blown into the passenger compartment by fan 39. In rotational positions of filter disk 25' intermediate between the positions shown in FIGS. 8 and 9, the output air stream ZL consists of a portion of external air AL and a portion of recirculated air UL.

Figure 10:
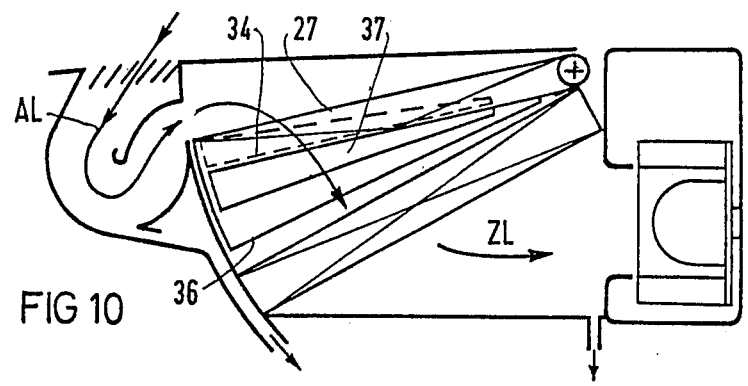

In the rotational position of filter disk 25' shown in FIG. 10, inlet port 34 is completely covered by side surface 27', while inlet port 33 is completely open. In this rotational position, only filtered external air is fed to the motor vehicle passenger compartment by fan 39.

Figure 11:
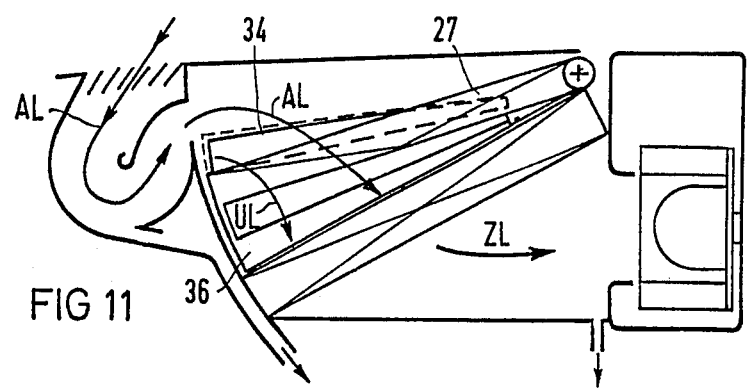

In the rotational position of filter disk 25' shown in FIG. 11, a portion of inlet port 34 has been uncovered so that output air stream ZL includes both filtered external air AL and filtered recirculated air UL.

Figure 12:
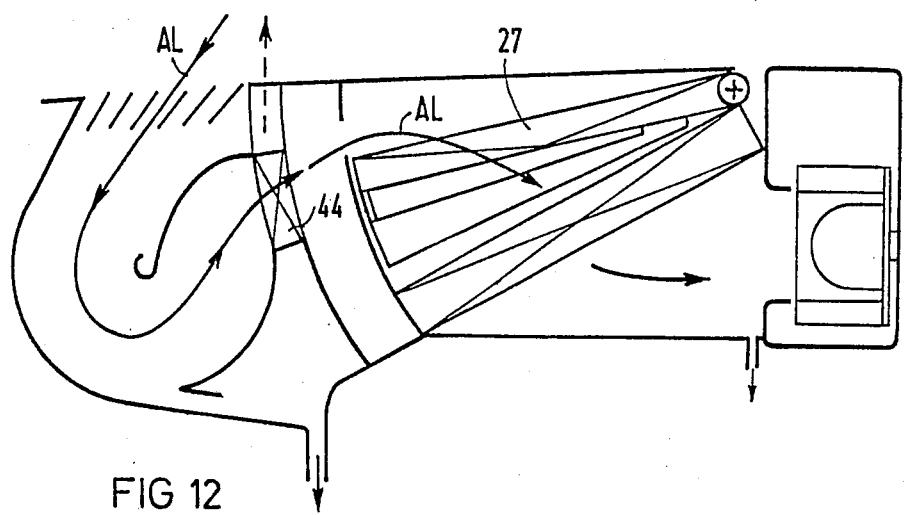
FIG. 12 is a schematic cross-sectional view of yet another embodiment of an air mixing chamber assembly in accordance with the present invention, showing a prefilter as well as a pivotably mounted filter disk.

As illustrated in FIG. 12, the embodiment of FIG. 8 may be provided with a replaceable prefilter 44 disposed in the path of external air AL upstream of the air mixing chamber.

In the embodiments of FIGS. 8 and 12, an air channel 40 is provided for conducting external air AL to inlet port 33. Air channel 40 is bounded by an approximately circular exterior wall 41 and an interior wall with a scooping tongue 42. A deflector 43 projects into air channel 40 so that a stream of external air AL carrying little water and dust is turned towards inlet port 33. A stream of external air carrying water and dust particles is caught by scoop or tongue 42 and conducted back to the external environment.

Figure 13:
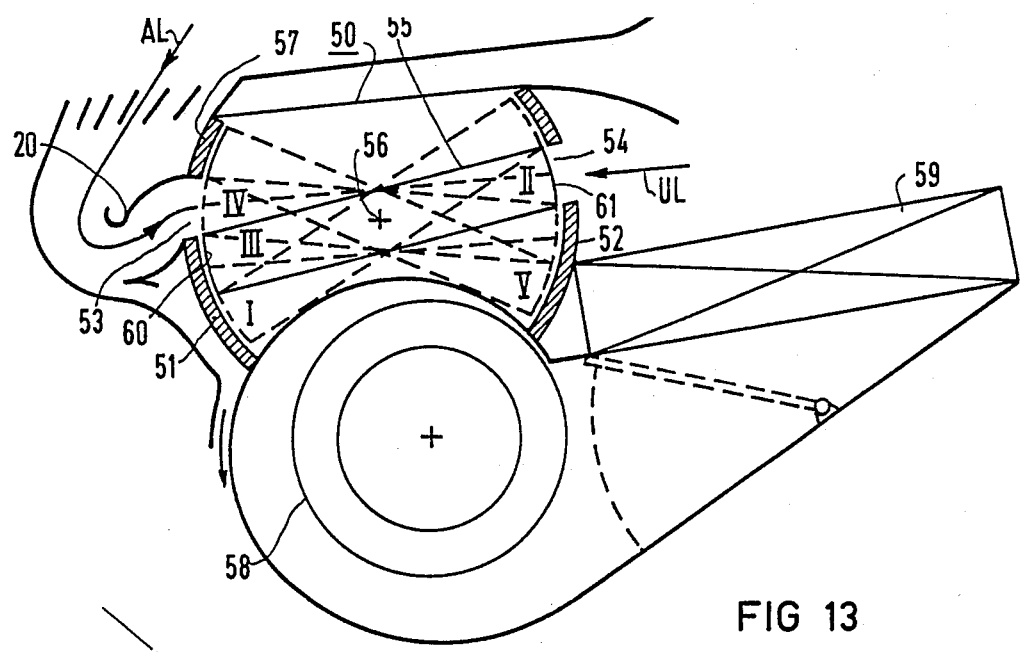
FIG. 13 is a schematic cross-sectional view of yet another embodiment of an air mixing chamber assembly in accordance with the present invention, showing an air chamber with a pair of opposed cylindrical walls.

In the embodiment of FIG. 13, a housing 50 which defines an air mixing chamber includes two walls 51 and 52 in the form of cylindrical sections provided with respective air inlet ports 53 and 54. Inlet port 53 communicates with the external environment for enabling the conveyance of external air AL into the air mixing chamber, while inlet port 54 communicates with the passenger compartment of a motor vehicle for enabling the introduction of recirculated air into the air mixing chamber. Cylindrical wall sections 51 and 52 have the same radius of curvature with a common center 56 coaxial with a rotational axis of a pivotably disposed filter disk 55. Filter disk 55 has a pair of end faces 60 and 61 which serve as slide elements to close off respective inlet ports 53 and 54 partially or totally, depending on the rotational position of filter disk 55.

In a first rotational position I of filter disk 55, both inlet ports 53 and 54 are completely open. However, only the incoming external air AL passes through filter disk 55. In a second rotational position II of the filter disk, inlet port 54 is blocked and only filtered external air is drawn by a blower 58 through the air mixing chamber into the motor vehicle passenger compartment. In a third rotational position III of the filter disk, a portion of each inlet port 53 and 54 is blocked by the respective end face 60 and 61 of filter disk 55 while the unblocked portions permit external air AL and recirculated air UL to pass through filter disk 55 into the vehicle's passenger compartment. In another filter disk rotational position IV, inlet port 53 is entirely blocked, thereby preventing external air from being drawn by blower 58, while inlet port 54 is completely uncovered and recirculated air is freely drawn through the filter disk. In yet another filter disk rotational position V, the output air stream ZL comprises both unfiltered external air AL and filtered recirculated air UL.

In rotating the filter disk 55 from position II to position IV, the fraction of filtered recirculated air increases steadily while the fraction of filtered external air decreases steadily.

Figure 14:
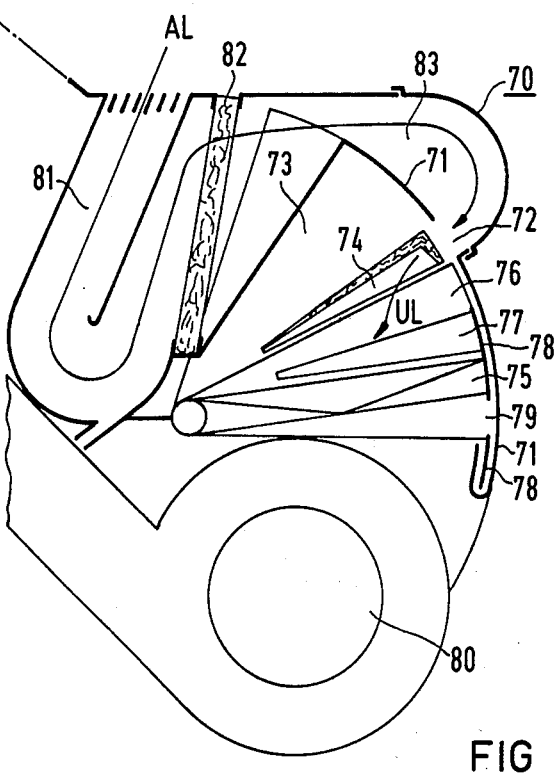
FIG. 14 is a schematic cross-sectional view of yet another embodiment of an air mixing chamber assembly in accordance with the present invention, showing a pivotably mounted filter disk with a pair of slide elements.

In the event that air inlet ports 53 and 54 are wider than filter disk 55, the end faces may be provided with slide elements which extend beyond the edges of the filter disk (see FIG. 14). As shown in FIG. 13, the output air stream ZL passes through a radiator or heat exchanger 59 which forms a part of the air conditioning system of the vehicle.

To exchange or clean filter disk 55 of the embodiment of FIG. 13, housing 50 may be provided with a closable port. In addition, a portion 57 of cylindrical section 51 above inlet port 53 can be detachably mounted to the remainder of the housing.

As illustrated in FIG. 14, another assembly in accordance with the present invention for mixing and filtering air in a motor vehicle's ventilating system comprises a housing 70 including demisting chamber 81, a prefilter 82 and an antechamber 83 through which air AL from the external environment passes to a filter connection piece including a cylindrical wall 71 and a pair of transversely extending front walls 73. One or both front walls 73 are provided with a wedge-shaped air inlet port 74, while cylindrical wall 71 is provided with a slit-like air inlet port 72 in the same circumferential or angular position as inlet port 74 (inlet ports 72 and 74 are radially aligned with one another). Air inlet port 74 communicates with the passenger compartment of a motor vehicle from recirculating air therefrom through the air mixing and filtering assembly of FIG. 14.

A filter disk 75 is pivotably mounted to housing 70 for rotation about an axis 82. Filter disk 75 is provided on an end face with a cylindrical slide element 78 and on a side surface with a disk-shaped slide element 76. Both slide elements 76 and 78 extend in a circumferential direction from each side of filter disk 75. Disk-shaped slide element 76 is provided on one side of filter disk 75 with a wedge-shaped opening 77 which in a predetermined rotational position of filter disk 75 is juxtaposed to inlet port 74. Cylindrical slide element 78 has, on the same side of F75 as wedge-shaped opening 77, a portion with an angular extent which is at least equal to the angular extent of opening 77 (i.e., overlaps opening 77 in the circumferential direction). On an opposite side of filter disk 75, slide element 78 is provided with a slot-like aperture 79 which, in a predetermined rotational position of filter disk 75, overlaps inlet port 72 in cylindrical wall section 71.

In the rotational position of filter disk 75 shown in FIG. 14, external air AL as well as recirculated air UL flows through filter disk 75 and a fan 80 and from thence into the passenger compartment of a motor vehicle. If filter disk 75 is pivoted from that rotational position counterclockwise about axis 82 (according to the convention established by the drawing), slide element 76 begins to cover inlet port 74 and a decreasing amount of air from the passenger compartment is recirculated.

Upon the attainment of a predetermined angular position of filter disk 75, inlet port 72 begins to be blocked by the leading portion of slide element 78 and the proportion of external air AL in the output stream decreases. Simultaneously, the proportion of recirculated air UL in the output stream ZL increases owing to the increasing juxtaposition of inlet portion 74 and opening 77 in slide element 76. Upon the closing of inlet port 72, the only air fed to the motor vehicle passenger compartment is air recirculated therefrom. With further rotation of filter disk 75 in the counterclockwise direction, both air supplies are cut off temporarily. Then, the output stream consists of increasing amounts of unfiltered external air. After the attainment of a predetermined rotational position of filter disk 75, the amount of unfiltered recirculated air increases while the amount of unfiltered external air simultaneously decreases until a point is reached at which only unfiltered air from the passenger compartment is supplied thereto the ventilating system.

What is claimed is:

1. An assembly for use in the ventilation system of a motor vehicle, said assembly comprising:
   a housing defining an air chamber, said housing including walls provided with first air inlet means communicating with the atmosphere outside said motor vehicle for introducing air from outside of said motor vehicle into said chamber, said walls being further provided with second air inlet means communicating with a passenger compartment of said motor vehicle for introducing air from said passenger compartment into said chamber, said walls being further provided with air outlet means communicating with said passenger compartment for conducting air from said air chamber to said passenger compartment; and
   air mix control means for controlling the proportions of air from outside said motor vehicle and air from said passenger compartment guided through said air chamber into said passenger compartment and for selectively filtering air guided into said passenger compartment, said air mix control means including a substantially planar filter pivotably mounted in said air chamber for rotation about a rotational axis.

2. The assembly defined in claim 1 wherein said air mix control means including said filter is adapted to control proportions of filtered and unfiltered air guided from said air chamber into said passenger compartment.

3. The assembly defined in claim 2 wherein said air mix control means including said filter is adapted to control proportions of filtered and unfiltered air from outside said motor vehicle and proportions of filtered and unfiltered air from said passenger compartment conducted to said passenger compartment from said air chamber.

4. The assembly defined in claim 1 wherein said housing includes a filter connection piece, said filter taking the form of a disc disposed at one end of said filter connection piece.

5. The assembly defined in claim 4 wherein said air mix control means includes a flap pivotably mounted to said housing and having a first end position closing said first air inlet means and a second end position closing said one end of said filter connection piece.

6. The assembly defined in claim 5 wherein said flap is rotatable about said rotational axis.

7. The assembly defined in claim 1 wherein rotational axis is located along an end face of said filter.

8. The assembly defined in claim 7 wherein housing includes a wall in the form of a cylindrical section coaxial with said axis of rotation.

9. The assembly defined in claim 8 wherein said first air inlet means and said second air inlet means are disposed in said cylindrical section and angularly spaced from one another, said filter being provided opposite said rotational axis with an end surface alternately juxtaposable to said first air inlet means and to said second air inlet means to alternately block said first air inlet means and said second air inlet means in accordance with the rotational position of said filter.

10. The assembly defined in claim 8 wherein said housing further includes an additional wall extending substantially perpendicularly to said rotational axis and said cylindrical section, one of said first air inlet means and said second air inlet means being disposed in said cylindrical section, another of said first air inlet means and said second air inlet means being disposed in said additional wall, said filter being provided opposite said rotational axis with an end surface juxtaposable to said one of said first air inlet means and said second air inlet means in accordance with the rotational position of said filter, said filter being further provided in a plane parallel to said additional wall with a slide surface juxtaposable to said other of said first air inlet means and said second air inlet means in accordance with the rotational position of said filter.

11. The assembly defined in claim 1 wherein said housing includes a first wall in the form of a first cylindrical section and a second wall in the form of a second cylindrical section, said second cylindrical section being substantially opposite said first cylindrical section, said first and said second cylindrical section being coaxial with said rotational axis, said rotational axis being located at approximately a center point of said filter, said first and said second cylindrical section having a common radius, said first air inlet means being provided in said first cylindrical section and said second air inlet means being provided in said second cylindrical section, said filter being provided on one side with a first end face juxtaposable to said first air inlet means and on an opposite side with a second end face juxtaposable to said second air inlet means to alternately block said first air inlet means and said second air inlet means in accordance with the rotational position of said filter.

12. The assembly defined in claim 1 wherein said rotational axis is located along an end face of said filter, said housing including a first wall in the form of a cylindrical section coaxial with said rotational axis, said housing further includes a second wall extending substantially perpendicularly to said rotational axis and said cylindrical section, one of said first air inlet means and said second air inlet means being disposed in said cylindrical section, another of said first air inlet means and said second air inlet means being disposed in said second wall, said filter being provided opposite said rotational axis with a first slide element in the form of a cylindrical section juxtaposable to said one of said first air inlet means and said second air inlet means in accordance with the rotational positional of said filter, said filter being further provided in a plane parallel to said second wall with a second slide element juxtaposable to said other of said first air inlet means and said second air inlet means in accordance with the rotational position of said filter, said first air inlet means and said second air inlet means being disposed in approximately the same radial plane.

13. The assembly defined in claim 12 wherein said first slide element has a first portion extending in a circumferential direction from said one side of said filter and a second portion extending in a circumferential direction from an opposite side of said filter, said second slide element extending in a circumferential direction from said one side of said filter, said second slide element being provided with an opening of substantially the same dimensions as said other of said first air inlet means and said second air inlet means, said opening being located within a common circular sector with said first portion of said first slide element, said second portion of said first slide element being provided with an aperture of substantially the same dimensions as said one of said first air inlet means and said second air inlet means.

* * * * *